US008348487B2

(12) United States Patent
Chen

(10) Patent No.: US 8,348,487 B2
(45) Date of Patent: Jan. 8, 2013

(54) HEADLAMP HAVING A LINEAR SLIDE FOR MOVING THE LIGHT SHADE

(75) Inventor: Hui-Chuam Chen, Fontana, CA (US)

(73) Assignee: Maxzone Auto Parts Corp., Fontana, CA (US)

( * ) Notice: Subject to any disclaimer, the term of this patent is extended or adjusted under 35 U.S.C. 154(b) by 337 days.

(21) Appl. No.: 12/854,895

(22) Filed: Aug. 12, 2010

(65) Prior Publication Data

US 2011/0255299 A1 Oct. 20, 2011

(30) Foreign Application Priority Data

Apr. 16, 2010 (TW) .............................. 99206995 U

(51) Int. Cl.
*B60Q 1/04* (2006.01)

(52) U.S. Cl. ......... 362/539; 362/538; 362/512; 362/514

(58) Field of Classification Search .................. 362/538, 362/539
See application file for complete search history.

(56) References Cited

U.S. PATENT DOCUMENTS 7,246,930 B2 * 7/2007 Yatsuda et al. ................ 362/539
8,235,570 B2 * 8/2012 Okubo et al. ................ 362/539

* cited by examiner

*Primary Examiner* — Tracie Y Green
(74) *Attorney, Agent, or Firm* — CKC & Partners Co., Ltd.

(57) ABSTRACT

A headlamp is disclosed. The headlamp includes a light source, at least one light shade, and a linear slide. The light source emits at least one light beam. The linear slide moves the light shade to shade at least one part of the light beam.

11 Claims, 16 Drawing Sheets

HEADLAMP HAVING A LINEAR SLIDE FOR MOVING THE LIGHT SHADE

RELATED APPLICATIONS

The application claims priority to Taiwan Application Serial Number 99206995, filed Apr. 16, 2010, which is herein incorporated by reference.

BACKGROUND

1. Technical Field

The present disclosure relates to a car illuminator. More particularly, the present disclosure relates to a headlamp.

2. Description of Related Art

The headlamp is attached to the front of a car for illuminating a light beam. Some headlamps have a light shade, and the light shade provides the cutoff for the light beam to change the shape of the light beam. Furthermore, the light shades having different shape make the light beam having different shape. However, the headlamp does not have a satisfying device to drive the light shades.

SUMMARY

According to one embodiment of the present disclosure, a headlamp includes a light source, at least one light shade, and a linear slide. The light source emits at least one light beam. The linear slide moves the light shade to shade at least one part of the light beam.

According to another embodiment of the present disclosure, a headlamp includes a reflector, a light source, at least one light shade, at least one guide, a linear slide, and a linear actuator. The light source is disposed in the reflector for emitting at least one light beam. The guide moveably couples the light shade to the reflector. In use, the linear actuator moves the linear slide to push the light shade to shade at least one part of the light beam.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
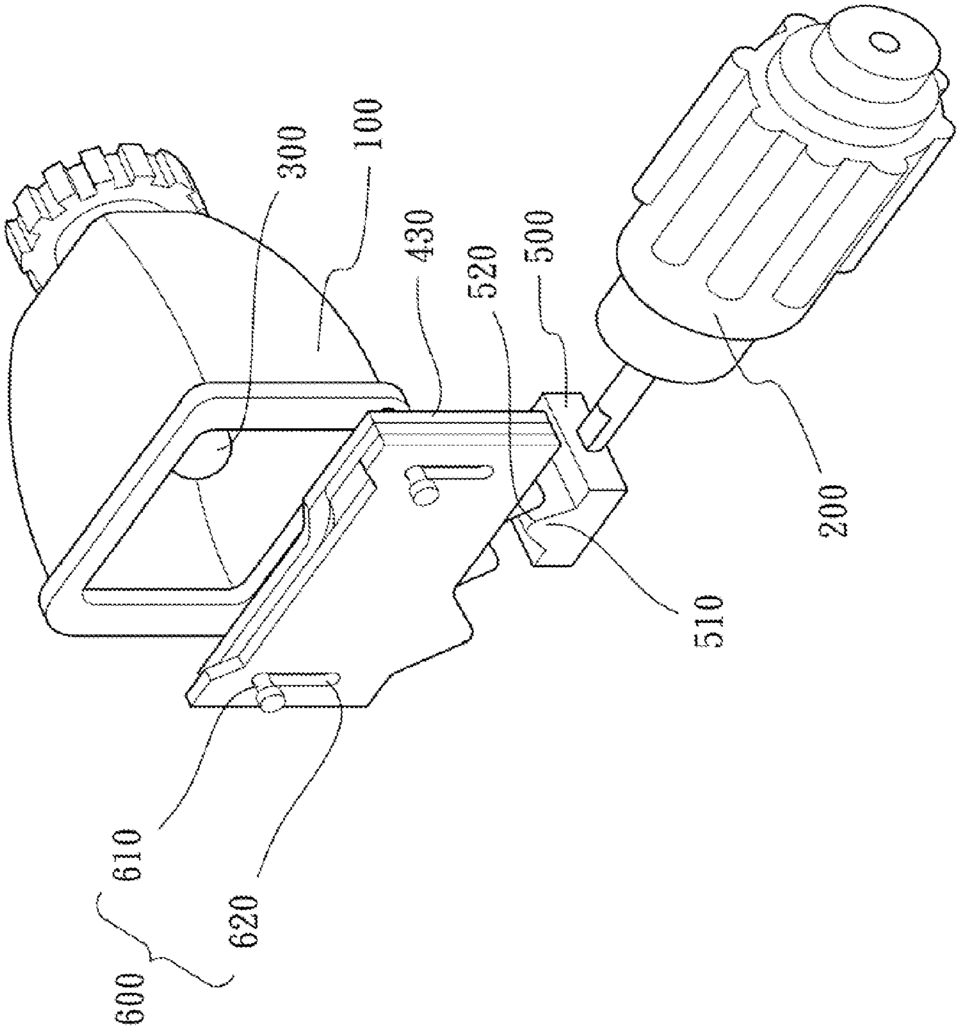
FIG. 1 is a three-dimensional view of a headlamp according to one embodiment of the present disclosure.
Figure 2:
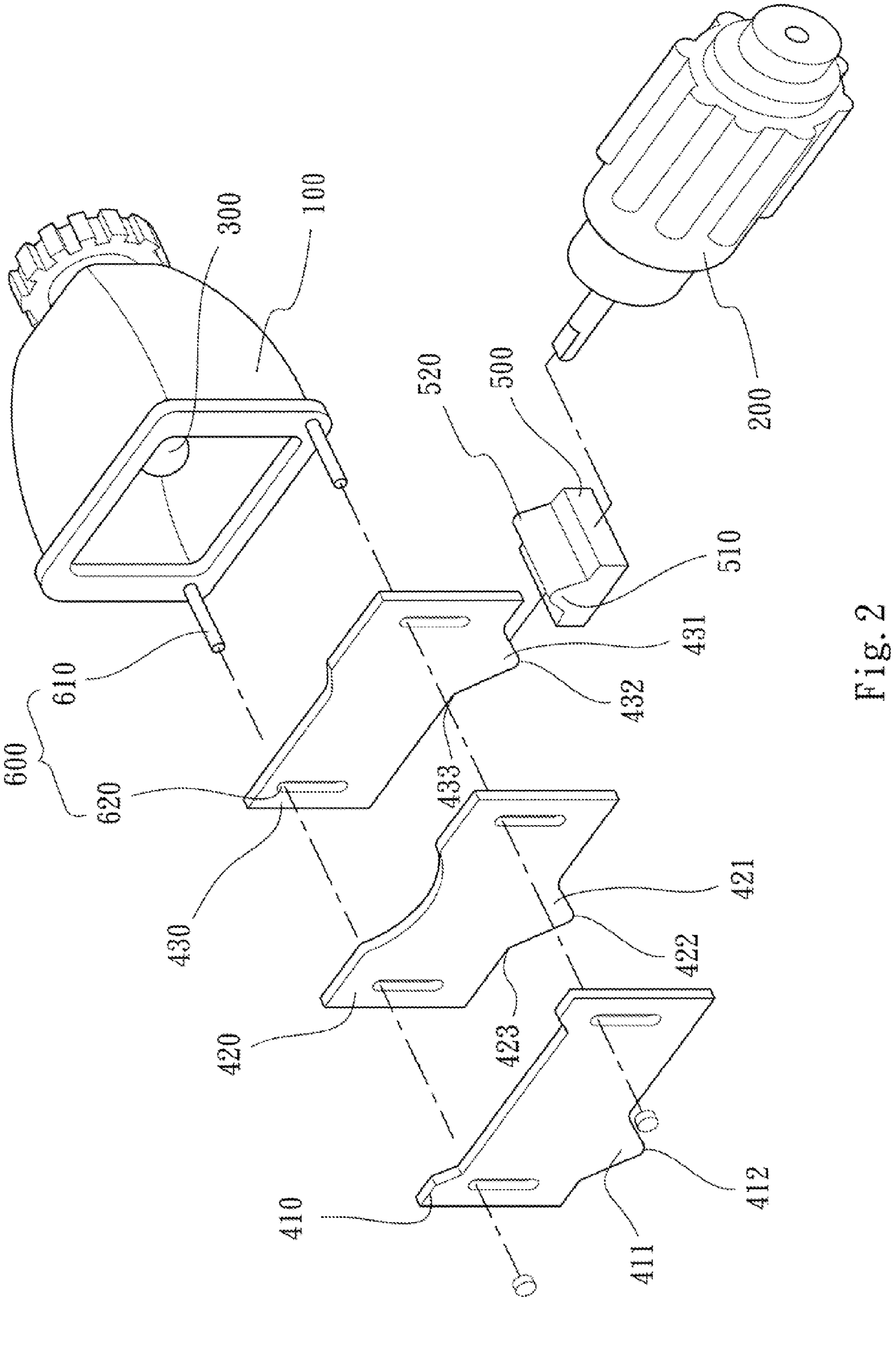
FIG. 2 is an exploded view of the headlamp of FIG. 1.

FIG. 1 is a three-dimensional view of a headlamp according to one embodiment of the present disclosure. FIG. 2 is an exploded view of the headlamp of FIG. 1. The headlamp includes a reflector 100, a light source 300, at least one light shade 430, at least one guide 600, a linear actuator 200, and a linear slide 500. The light source 300 is disposed in the reflector 100 for emitting at least one light beam. The guide 600 moveably couples the reflector 100 and the light shade 430. The linear slide 500 is connected to the linear actuator 200 for pushing the light shade 430 to shade at least one part of light beam.

The guide 600 includes a pin 610 and a groove 620. The pin 610 is disposed on the reflector 100. The groove 620 is linear and disposed in the light shade 430. The pin 610 is slidably received in the groove 620. Furthermore, the groove 620 can be disposed in the reflector 100, and the pin 610 can be slidably received in the groove 620.

Moreover, the linear actuator 200 can be replaced by a solenoid valve, a linear-motion bearing, or a worm drive etc. The devices said above have the same character, linear motion.

Figure 3:
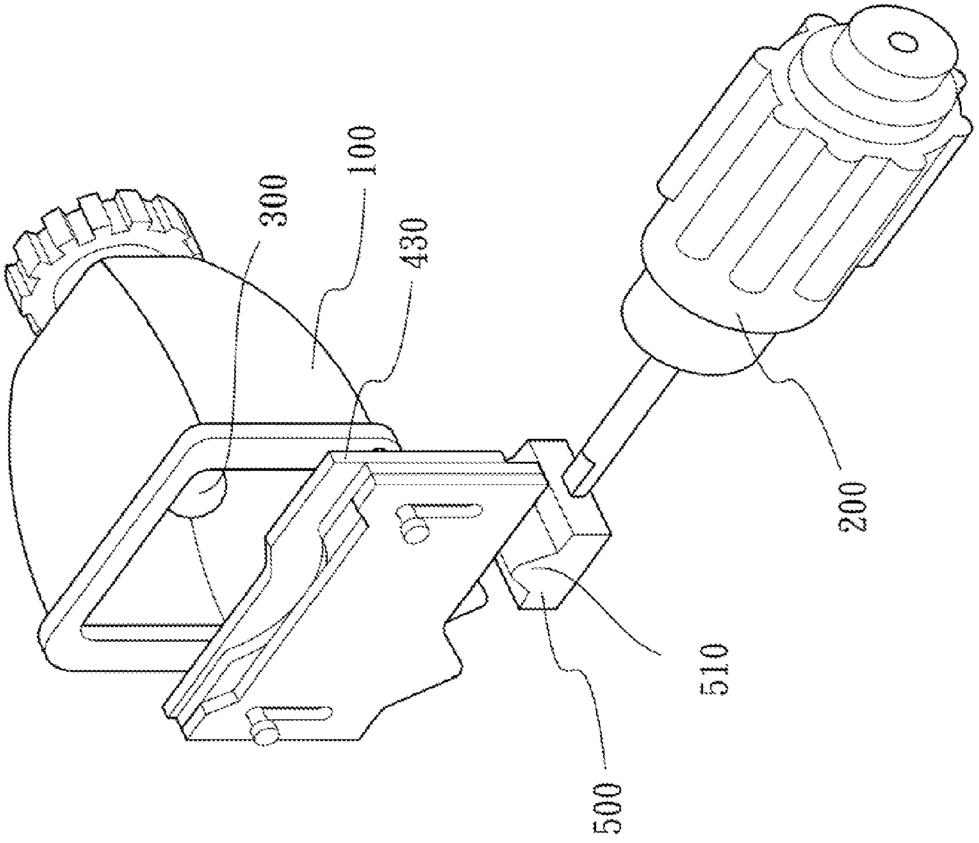
FIG. 3 is a three-dimensional view of the headlamp of FIG. 1, showing that a linear slide is under a light shade.

FIG. 3 is a three-dimensional view of the headlamp of FIG. 1. The linear actuator 200 drives the linear slide 500 to move. The light shade 430 moves upwardly and shades at least one part of the light beam for changing the shape of the light beam, when the linear slide 500 moves to the underside of the light shade 430 and pushes the light shade 430.

The light shade 430 falls when the linear slide 500 is removed. Furthermore, an elastic device (not shown in figures) connects the light shade 430 and the reflector 100. The elastic device charges the restoring force when the light shade 430 is pushed by the linear slide 500. The light shade 430 is reset by the elastic device when the linear slide 500 is removed.

Returned to FIG. 2, in detail, the light shade 430 includes a follower part 431, an arc part 432, and an indentation 433. The arc part 432 is positioned on the follower part 431. The indentation 433 is located next to the follower part 431. The linear slide 500 includes a protrusion 510 and an arc part 520. The arc part 520 is positioned on the protrusion 510. The follower part 431 is located in the moving path of the protrusion 510. The protrusion 510 pushes the follower part 431 to move the light shade 430 upwardly when the linear actuator 200 drives the linear slide 500 and the arc part 520 of the linear slide 500 contacts the arc part 432 of the light shade 430. The light shade 430 falls when the linear actuator 200 drives the linear slide 500 and the protrusion 510 is removed from the underside of the follower part 431.

The number of the guide 600 is two. The two guides 600 are disposed on two sides of the light shade 430. The light shade 430 can move steady by the guides 600 when the linear slide 500 pushes the light shade 430.

Figure 4:
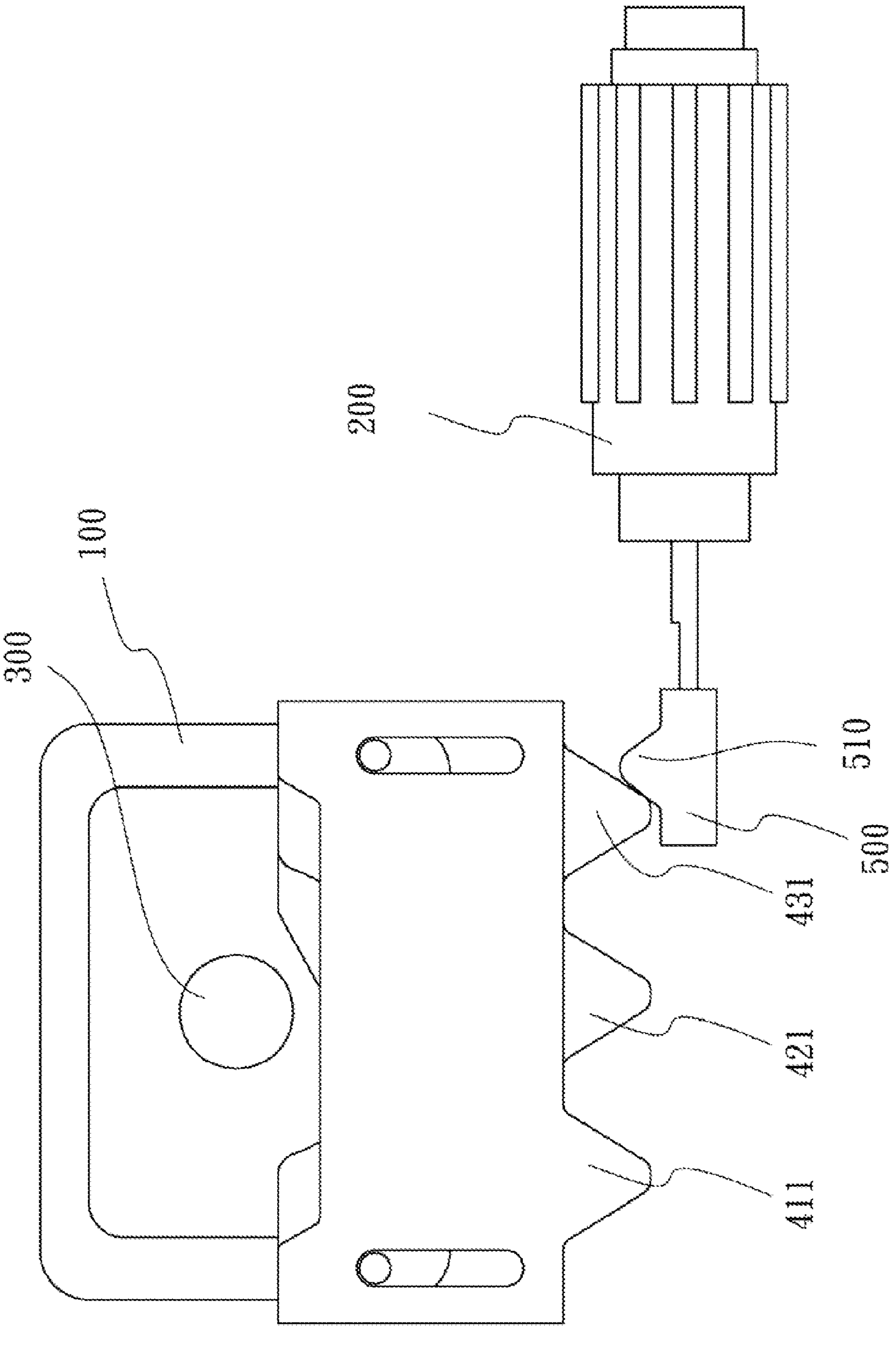
FIG. 4 is a front view of the headlamp of FIG. 1.

FIG. 4 is a front view of the headlamp of FIG. 1. The number of the light shade 430 is three. Each of the light shades 410, 420, 430 has a follower part 411, 421, 431, an arc part

412, 422, 432, and an indentation 413, 423, 433. The follower parts 411, 421, 431 are located at different distances from the protrusion 510. In detail, the distance between the follower part 431 and the protrusion 510 is the smallest, and the distance between the follower part 411 and the protrusion 510 is the largest.

Figure 5:
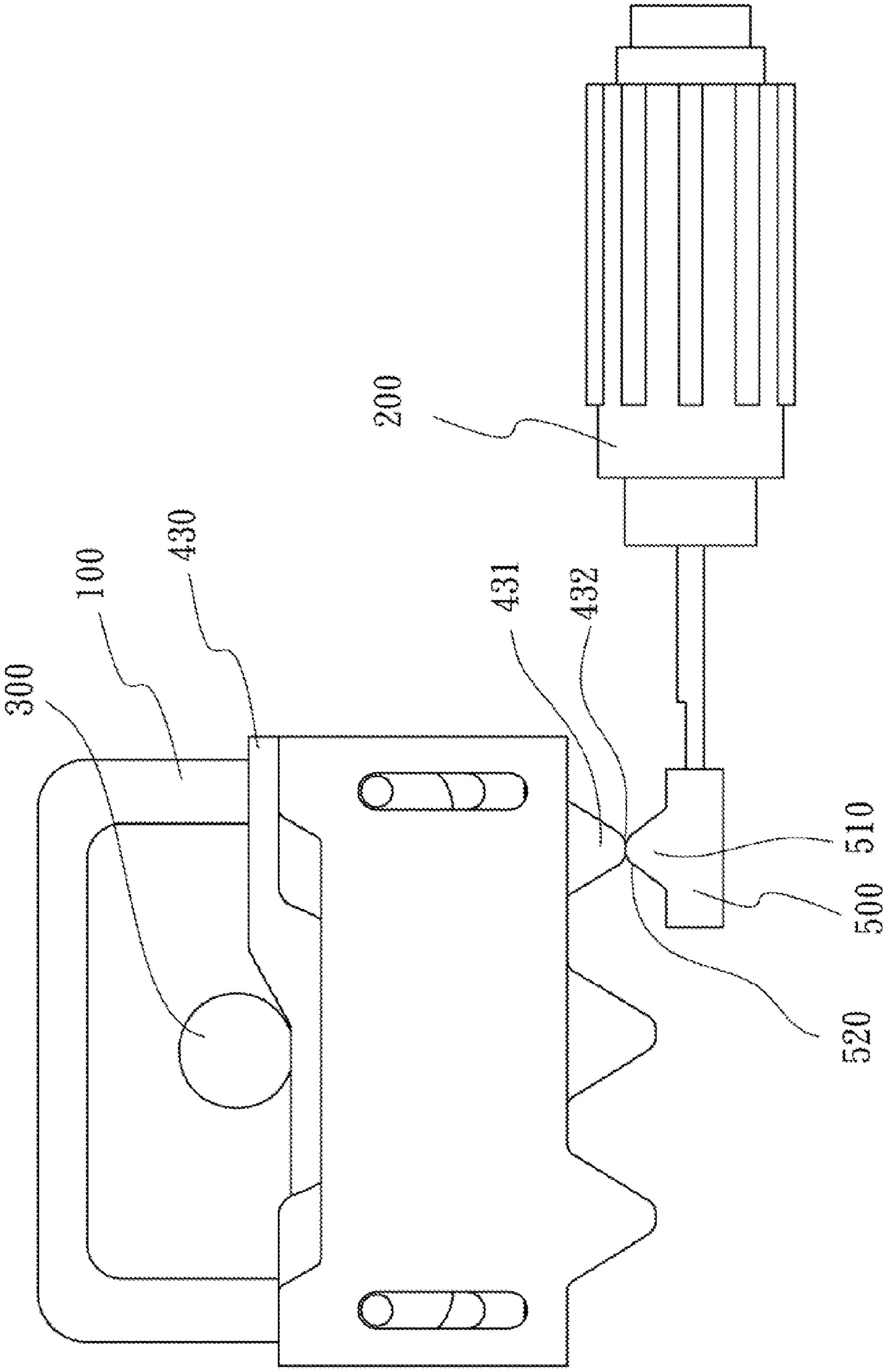
FIG. 5 is a front view of the headlamp of FIG. 1, showing that the linear slide pushes one light shade.

FIG. 5 is a front view of the headlamp of FIG. 1, showing that the linear slide 500 pushes the light shade 430. The linear actuator 200 drives the linear slide 500 to move. The linear slide 500 pushes the light shade 430 upwardly first to shade at least one part of the light beam, because the distance between the follower part 431 and the protrusion 510 is the smallest.

Figure 6:
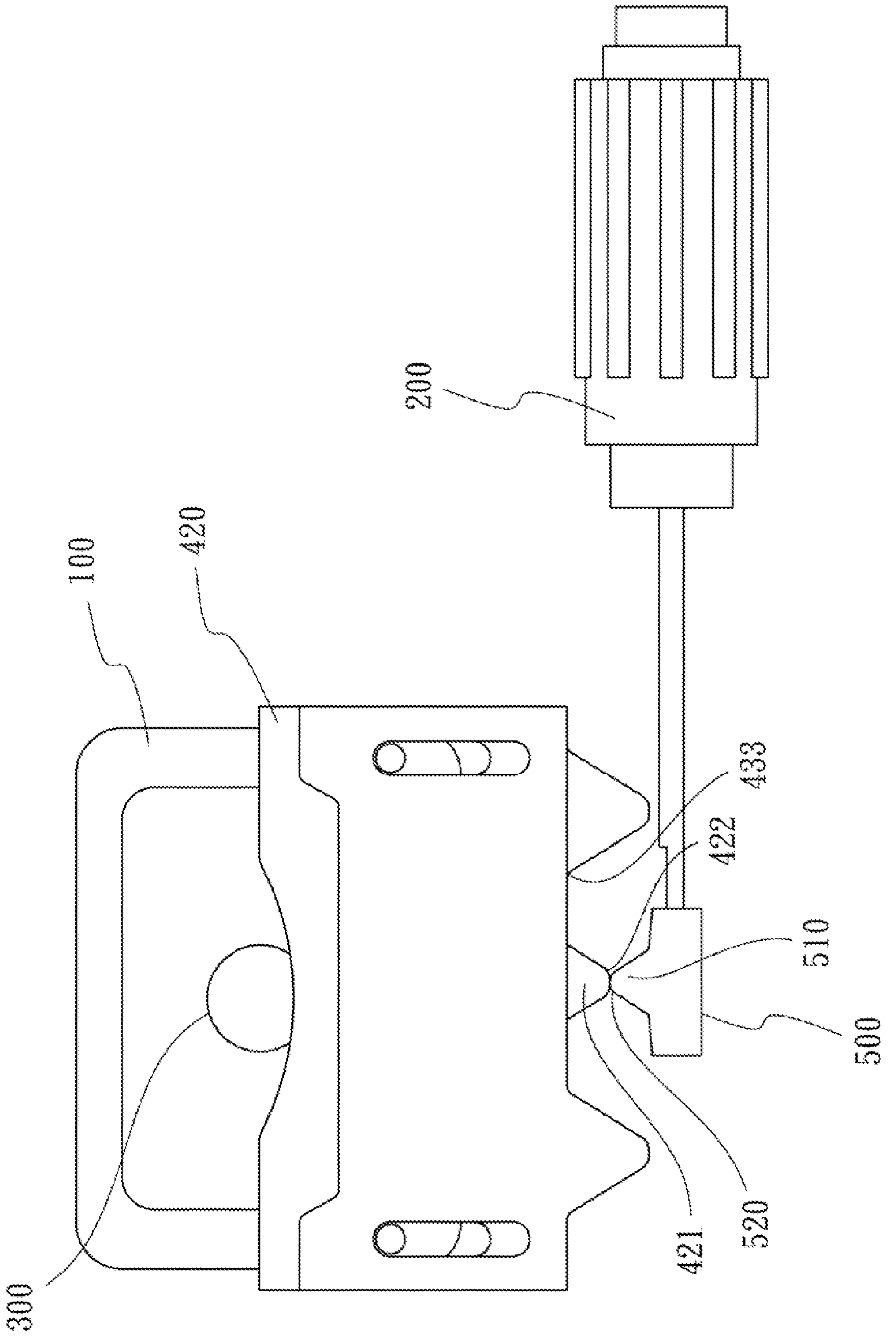
FIG. 6 is a front view of the headlamp of FIG. 1, showing that the linear slide pushes another light shade.

FIG. 6 is a front view of the headlamp of FIG. 1, showing that the linear slide 500 pushes the light shade 420. The light shade 430 falls when the protrusion 510 moves to the underside of the indentation 433. Furthermore, the linear slide 500 pushes the light shade 420 upwardly to shade at least one part of the light beam.

Figure 7:
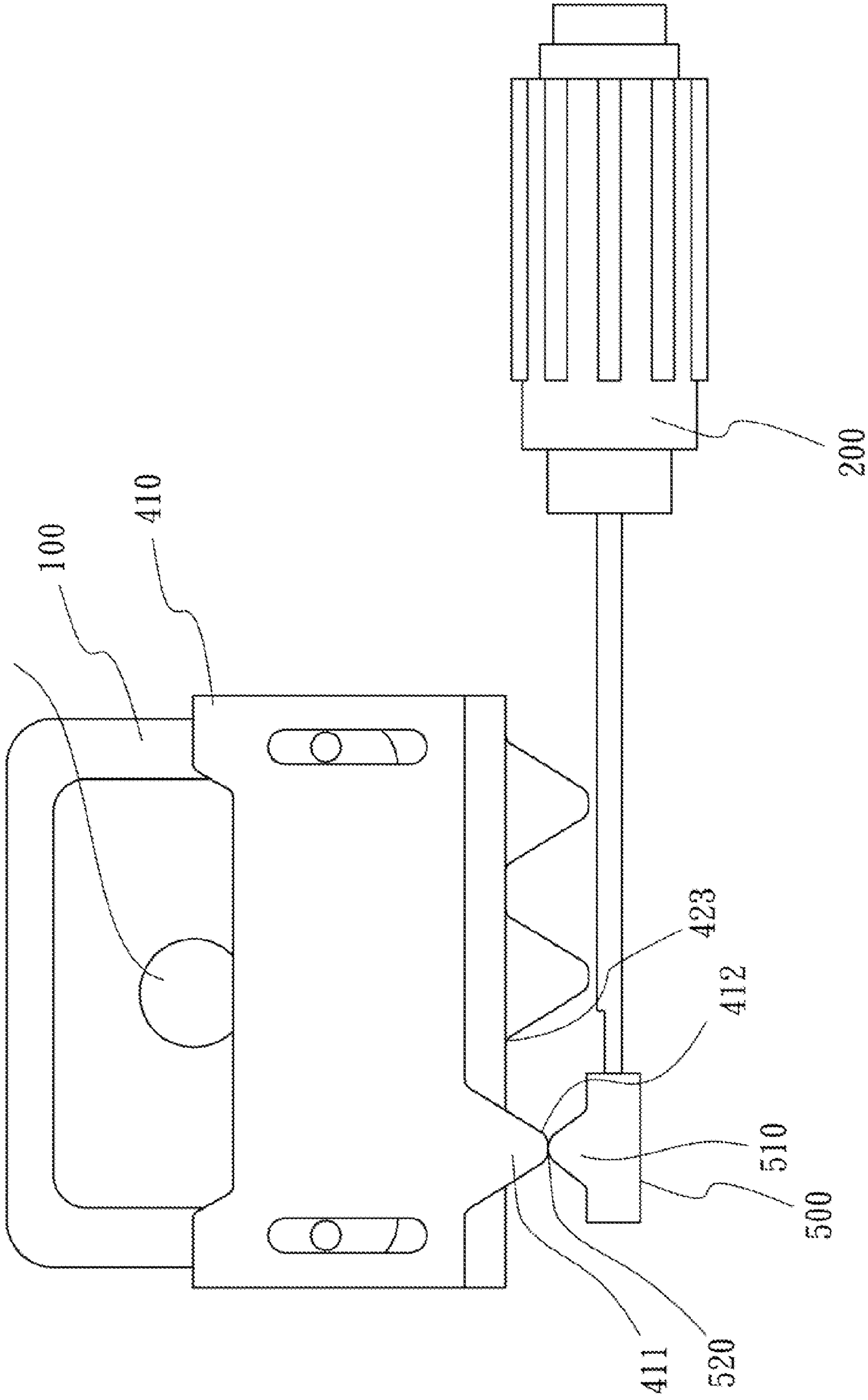
FIG. 7 is a front view of the headlamp of FIG. 1, showing that the linear slide pushes yet another light shade.

FIG. 7 is a front view of the headlamp of FIG. 1, showing that the linear slide 500 pushes the light shade 410. Similarly, the light shade 420 falls and the light shade 410 moves upwardly to shade at least one part of the light beam, when the linear slide 500 keeps moving.

Figure 8:
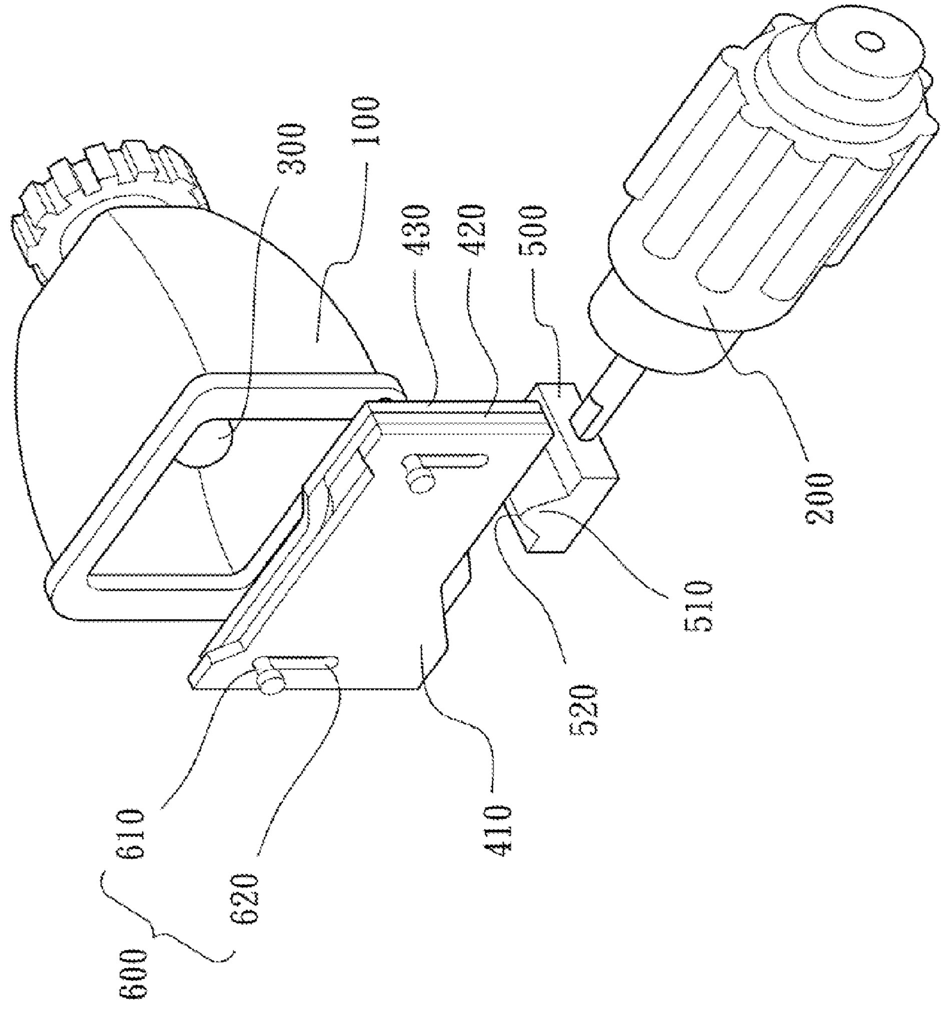
FIG. 8 is a three-dimensional view of a headlamp according to another embodiment of the present disclosure.

FIG. 8 is a three-dimensional view of a headlamp according to another embodiment of the present disclosure. The headlamp of FIG. 8 is substantially the same as the headlamp of FIG. 1. The difference is that the protruding distances of the follower part 411, 421, 431 are different, and the light shades 410, 420, 430 of FIG. 8 don't have the indentation 413, 423, 433.

Figure 9:
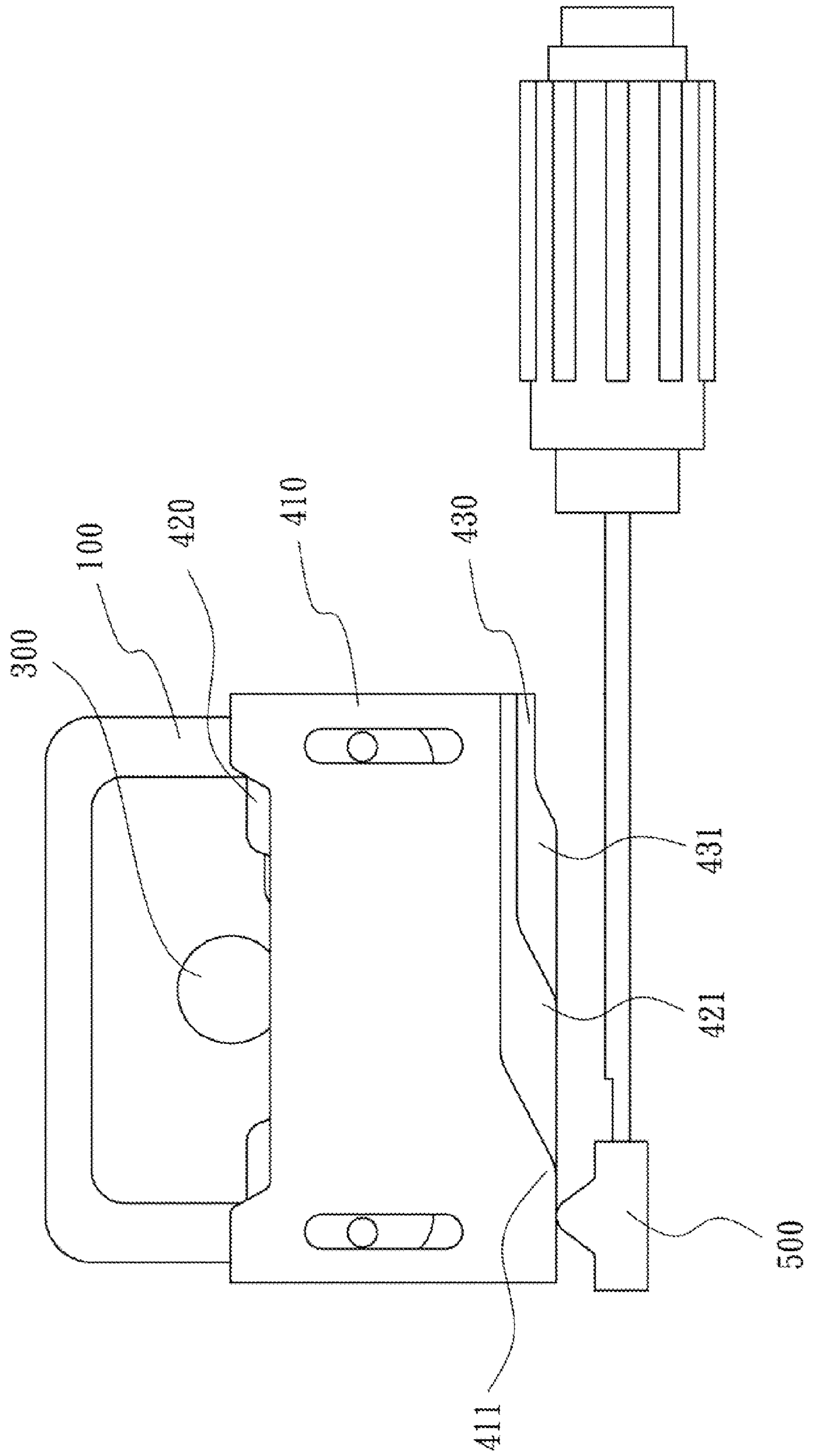
FIG. 9 is a front view of the headlamp of FIG. 8, showing that the linear slide pushes all light shades.

FIG. 9 is a front view of the headlamp of FIG. 8, showing that the linear slide 500 pushes all light shades 410, 420, 430. In detail, the protruding distance of the follower part 431 is the smallest, and the protruding distance of the follower part 411 is the largest.

Therefore, the moving distance of the light shade 410 is the largest, and the moving distance of the light shade 430 is the smallest, when the three light shades 410, 420, 430 shade one part of the light beam at the same time.

Figure 10:
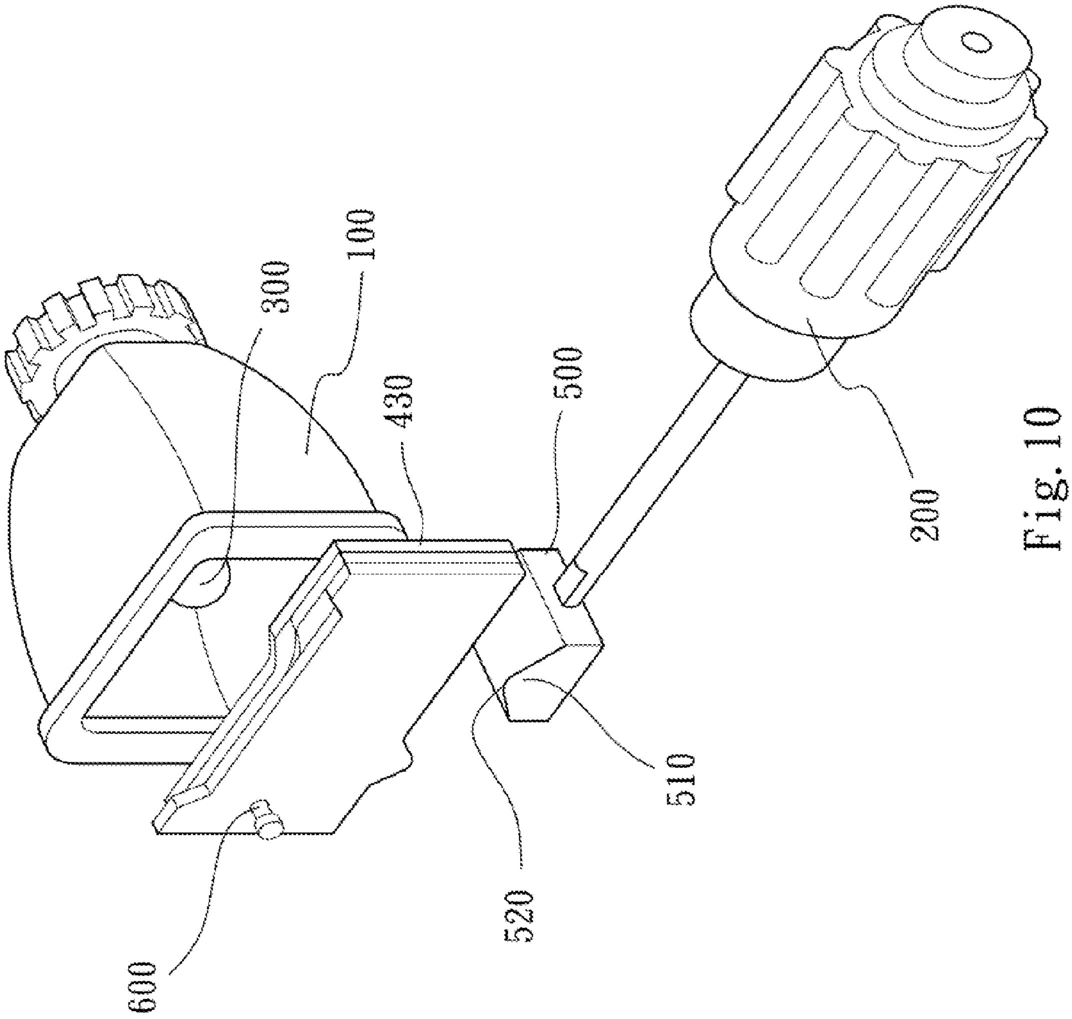
FIG. 10 is a three-dimensional view of a headlamp according to yet another embodiment of the present disclosure.
Figure 11:
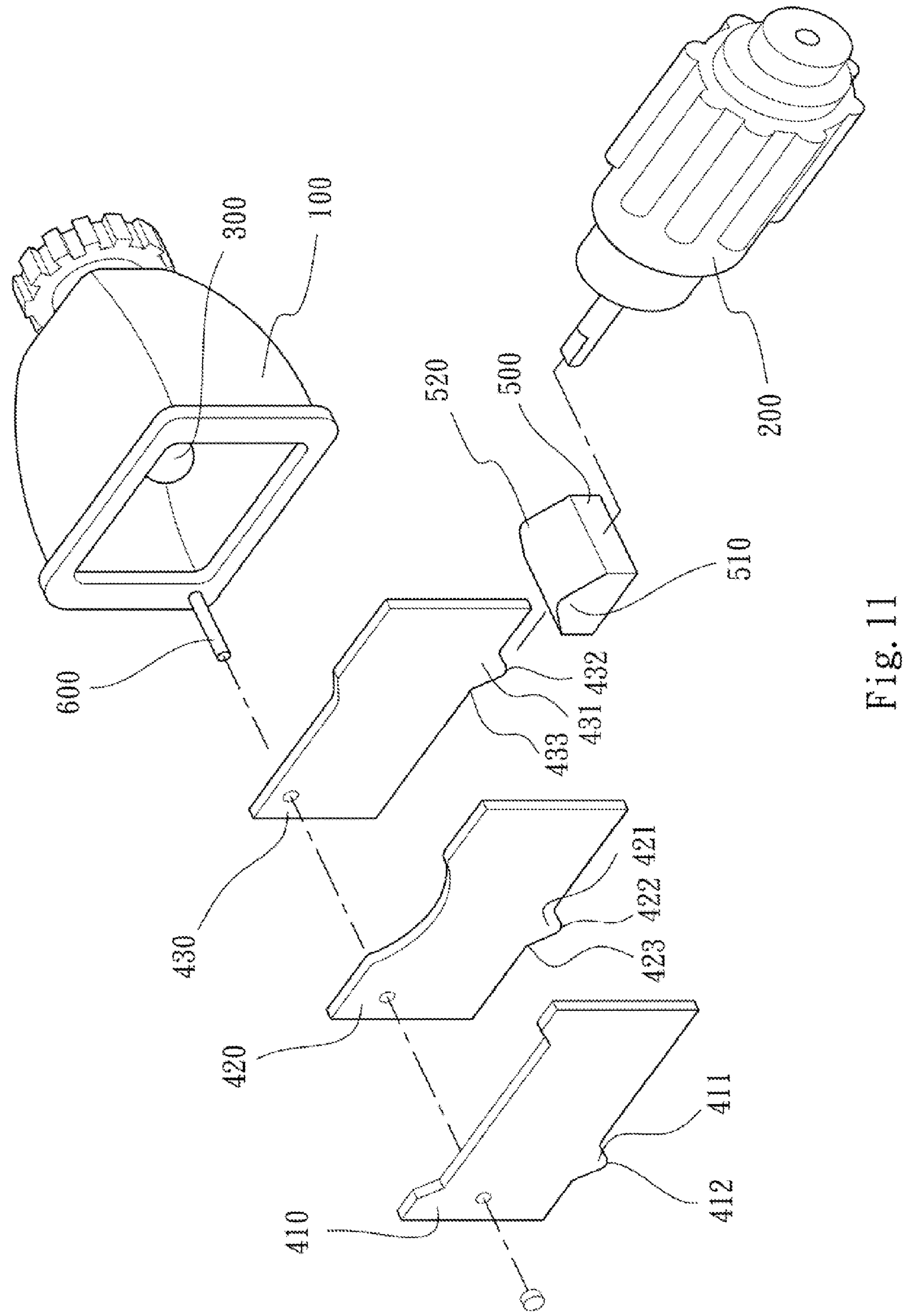
FIG. 11 is an exploded view of the headlamp of FIG. 10.
Figure 12:
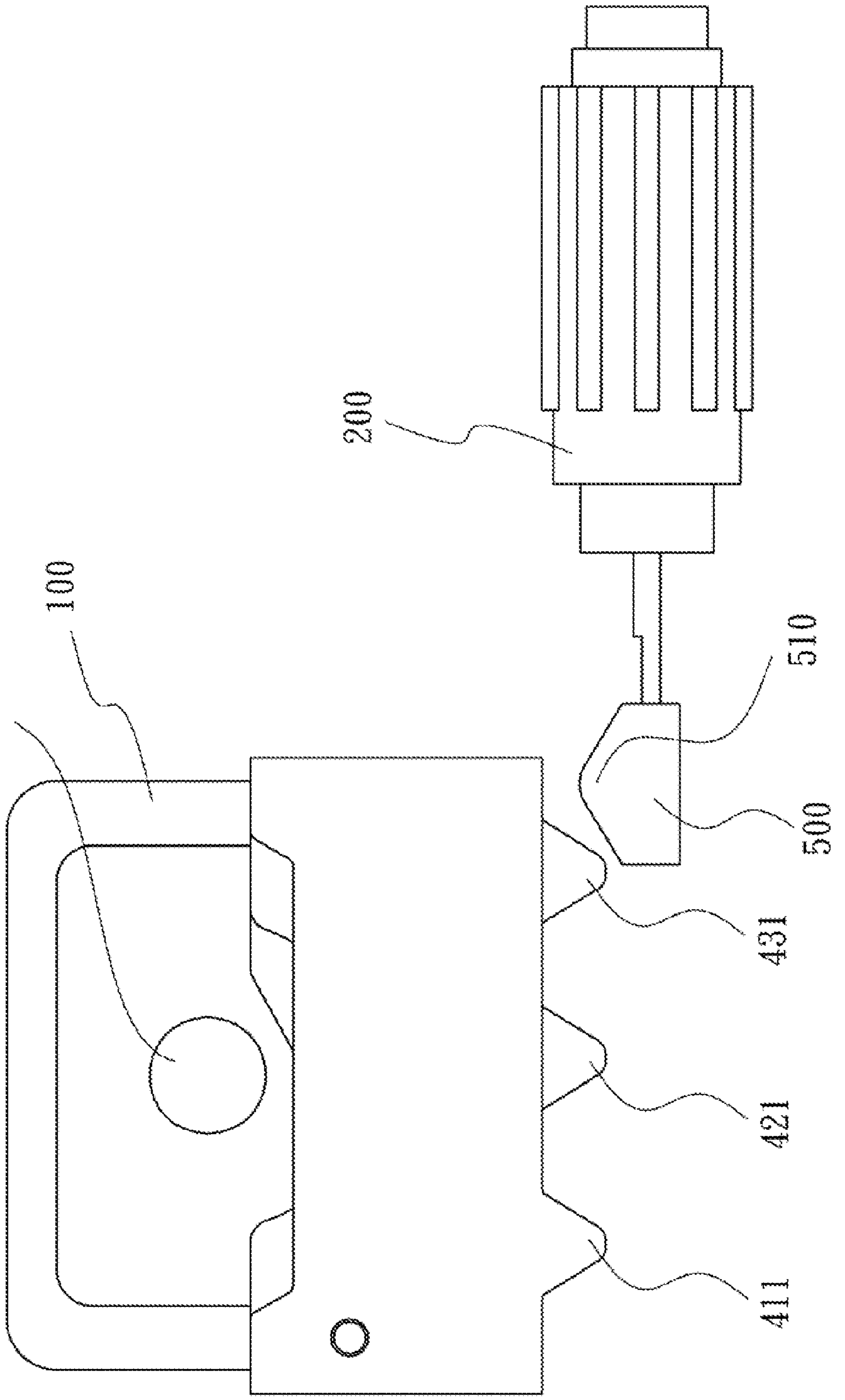
FIG. 12 is a front view of the headlamp of FIG. 10.

FIG. 10 is a three-dimensional view of a headlamp according to yet another embodiment of the present disclosure. FIG. 11 is an exploded view of the headlamp of FIG. 10. FIG. 12 is a front view of the headlamp of FIG. 10. The headlamp of FIG. 10 is substantially the same as the headlamp of FIG. 1. The difference is that the guide 600 is a pivot pivotally connecting the light shades 410, 420, 430 to the reflector 100.

Figure 13:
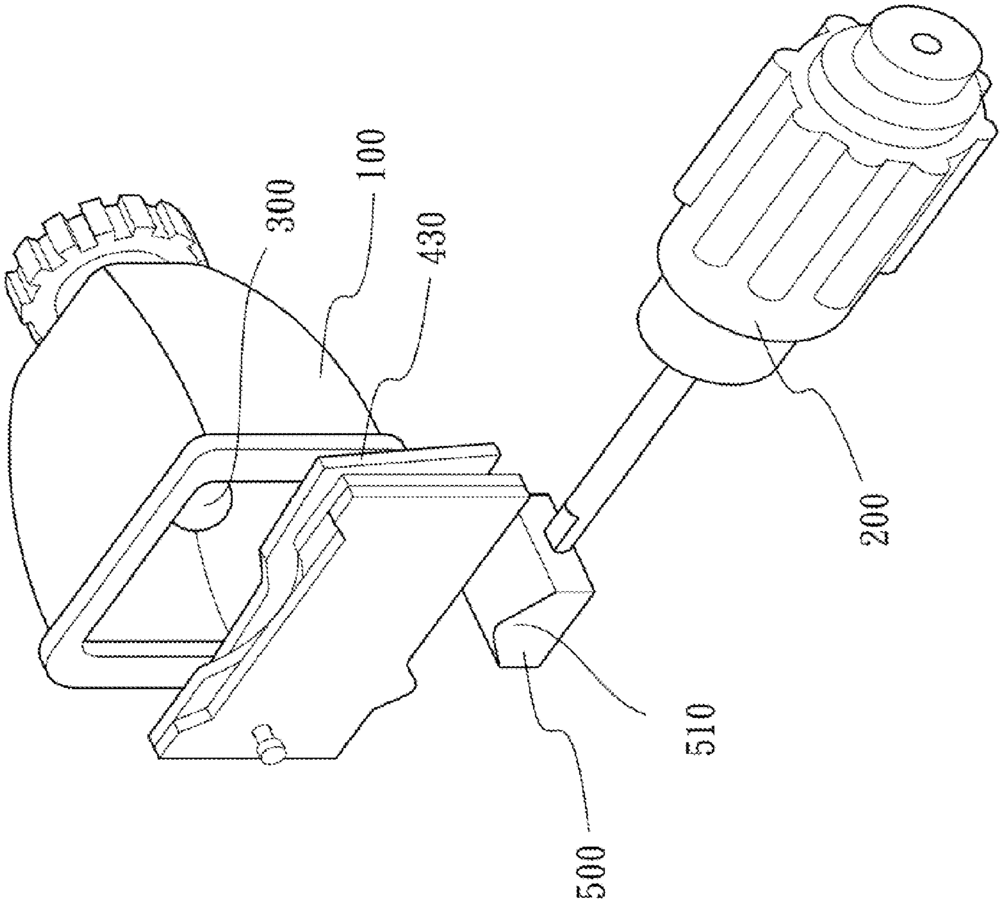
FIG. 13 is a three-dimensional view of the headlamp of FIG. 10, showing that a linear slide is under a light shade.

FIG. 13 is a three-dimensional view of the headlamp of FIG. 10, showing that the linear slide 500 is under the light shades 410, 420, 430. The light shades 410, 420, 430 pivot around the guide 600 when the linear slide 500 pushes the light shades 410, 420, 430. Furthermore, the guide 600 can be disposed on the light shades 410, 420, 430 and inserted into the reflector 100.

Figure 14:
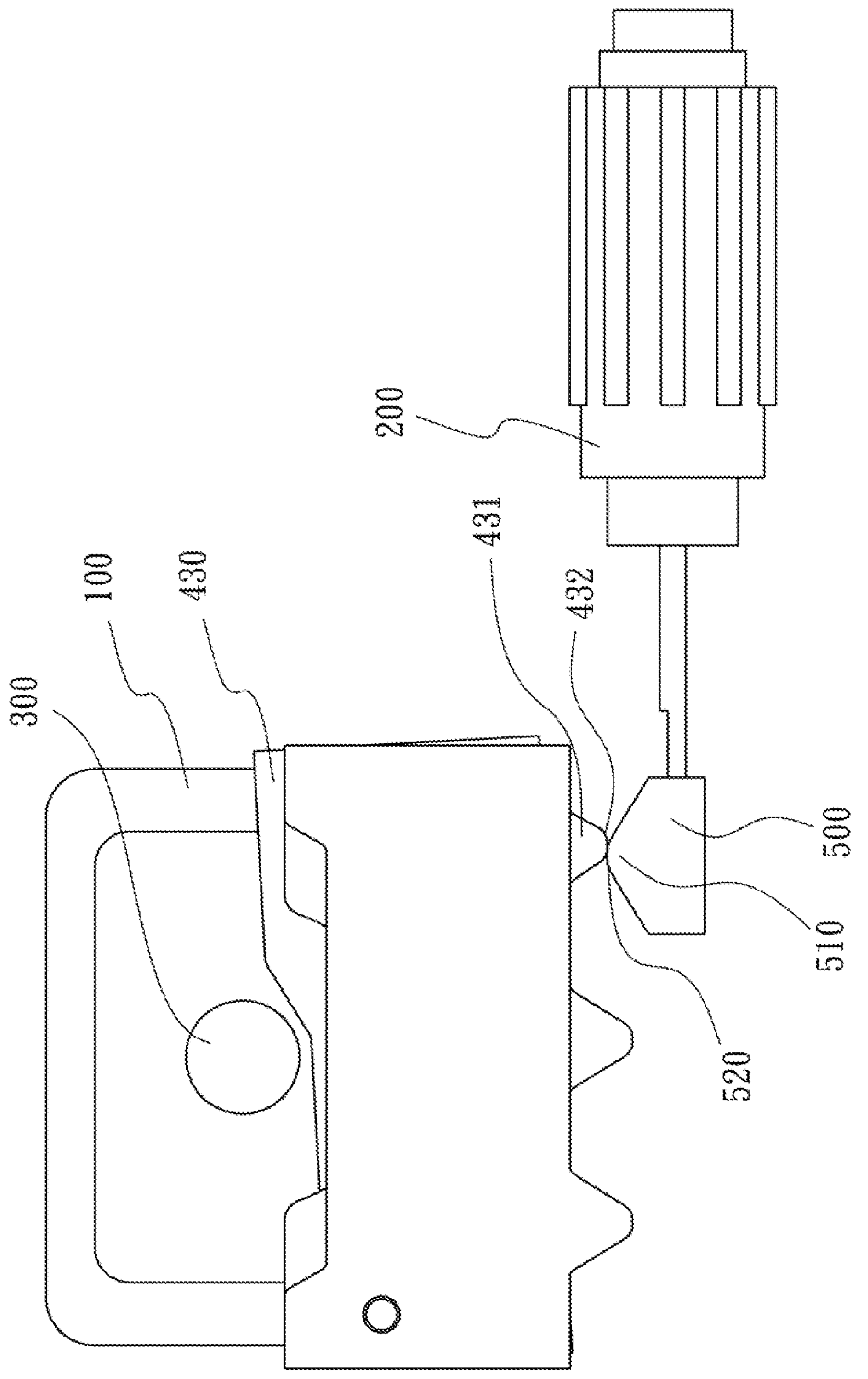
FIG. 14 is a front view of the headlamp of FIG. 10, showing that the linear slide pushes one light shade.

FIG. 14 is a front view of the headlamp of FIG. 10, showing that the linear slide 500 pushes one light shade 430. The linear slide 500 pushes the light shade 430 to rotate and shade at least one part of the light beam.

Figure 15:
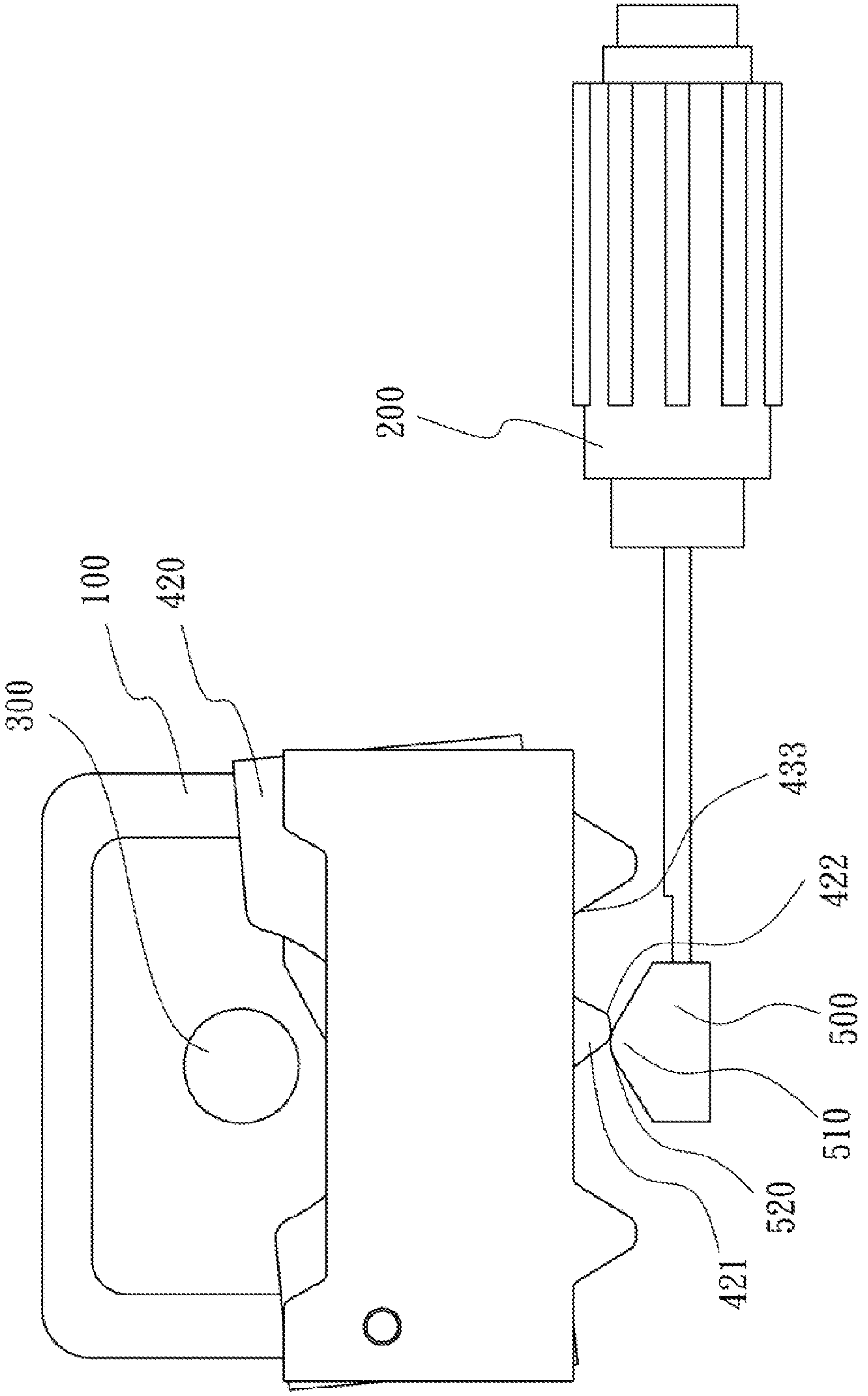
FIG. 15 is a front view of the headlamp of FIG. 10, showing that the linear slide pushes another light shade.

FIG. 15 is a front view of the headlamp of FIG. 10, showing that the linear slide 500 pushes another light shade 420. The light shade 430 falls when the protrusion 510 moves to the underside of the indentation 433. Furthermore, the linear slide 500 pushes the light shade 420 to rotate and shade at least one part of the light beam.

Figure 16:
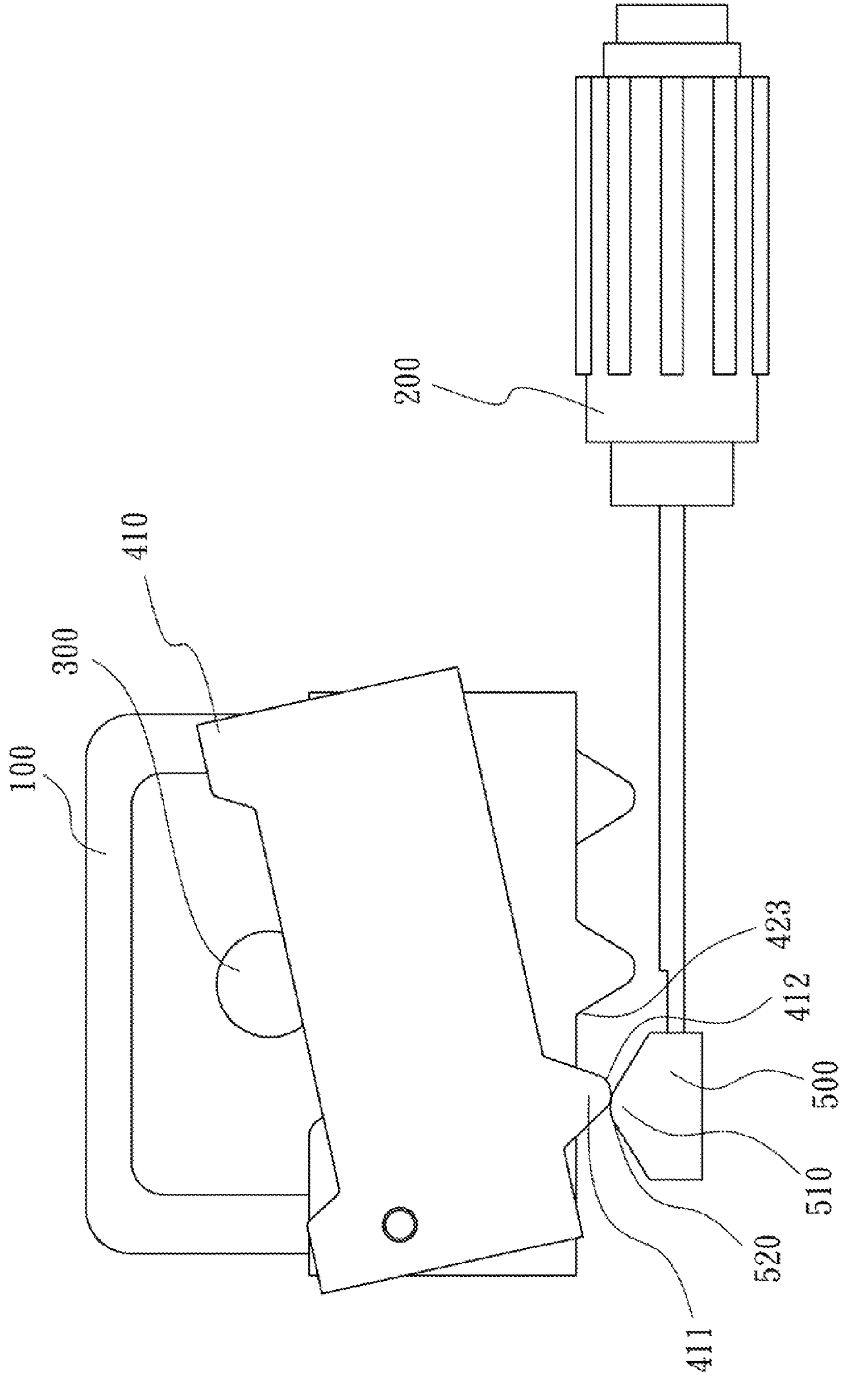
FIG. 16 is a front view of the headlamp of FIG. 10, showing that the linear slide pushes yet another light shade.

FIG. 16 is a front view of the headlamp of FIG. 10, showing that the linear slide 500 pushes yet another light shade 410. Similarly, the light shade 420 falls and the light shade 410 is rotated to shade at least one part of the light beam, when the linear slide 500 keeps on moving.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims is not intended to invoke the provisions of 35 U.S.C. §112, 6th paragraph.

What is claimed is:

1. A headlamp, comprising:
a light source for emitting at least one light beam;
at least one light shade; and
a linear slide for moving the light shade to shade at least one part of the light beam.

2. The headlamp of claim 1, wherein the light shade comprises a follower part disposed thereon, and the linear slide comprises a protrusion for pushing the follower part.

3. The headlamp of claim 2, wherein the number of the light shade is plural, and the light shades are located at different distances from the protrusion.

4. The headlamp of claim 2, wherein the light shade comprises an indentation therein and located next to the follower part.

5. A headlamp, comprising:
a reflector;
a light source disposed in the reflector for emitting at least one light beam;
at least one light shade;
at least one guide moveably coupling the light shade to the reflector;
a linear slide;
a linear actuator for moving the linear slide to push the light shade to shade at least one part of the light beam.

6. The headlamp of claim 5, wherein the linear slide comprises a protrusion disposed thereon, and the light shade comprises a follower part located in the moving path of the protrusion.

7. The headlamp of claim 6, wherein the number of the light shade is plural, and the light shades are located at different distances from the protrusion.

8. The headlamp of claim 6, wherein the number of the light shade is plural, and the protruding distances of the follower parts are different.

9. The headlamp of claim 6, wherein the light shade comprises an indentation therein and located next to the follower part.

10. The headlamp of claim 5, wherein the guide comprises
a groove disposed in the light shade;
a pin disposed on the reflector and slidably received in the groove.

11. The headlamp of claim 5, wherein the guide is a pivot pivotally connecting the light shade to the reflector.

* * * * *